Figure 1:
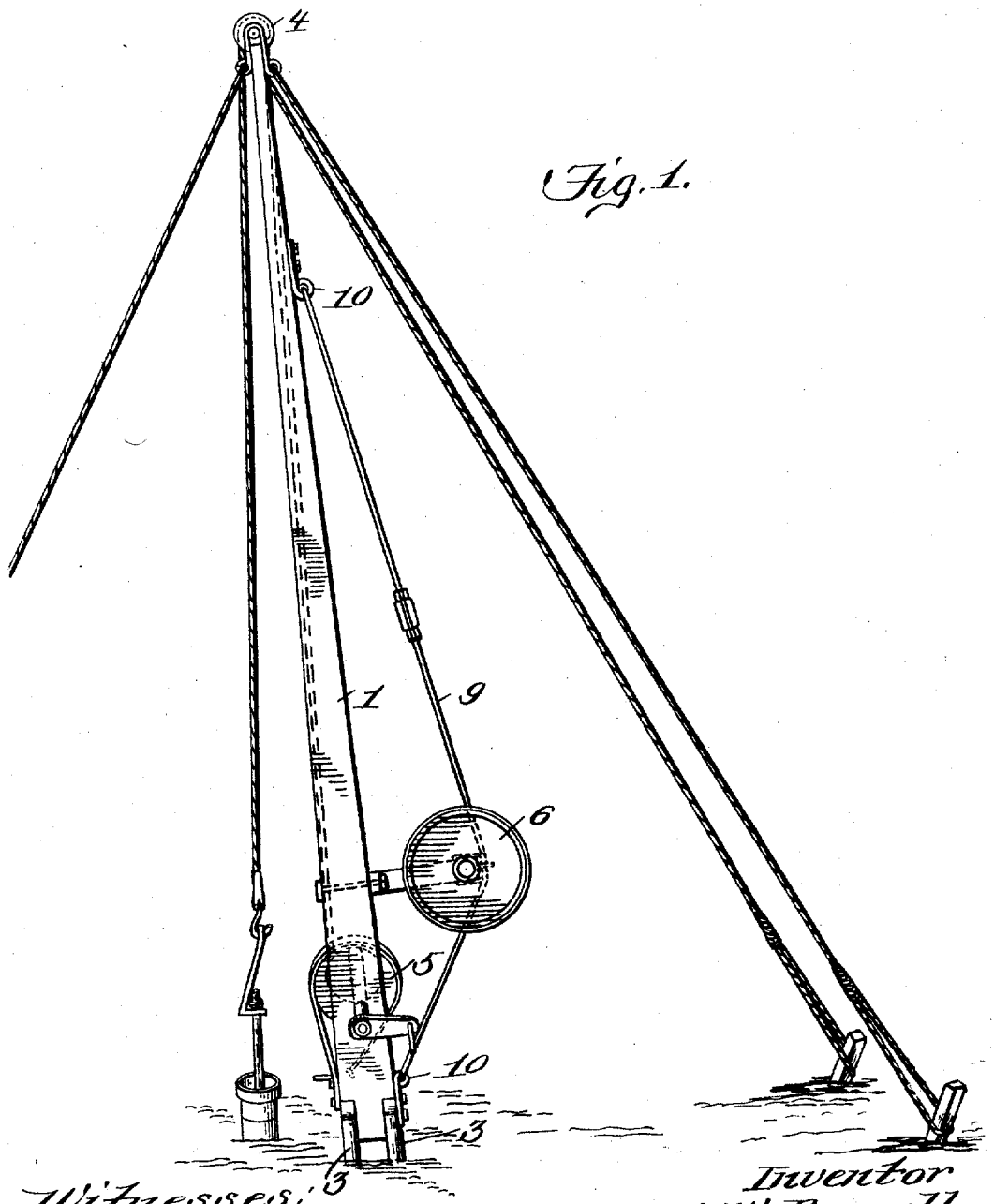

No. 12,389. REISSUED SEPT. 12, 1905.

F. W. PENNELL.

PORTABLE RIG FOR PULLING OIL WELLS.

APPLICATION FILED JAN. 23, 1905.

2 SHEETS—SHEET 1.

Witnesses:
C. D. Kesler
James L. Norris, Jr.

Inventor
Frank W. Pennell
By James L. Norris
Atty.

ANDREW. B. GRAHAM CO., PHOTO-LITHOGRAPHERS, WASHINGTON, D. C.

No. 12,389.
REISSUED SEPT. 12, 1905.
F. W. PENNELL.
PORTABLE RIG FOR PULLING OIL WELLS.
APPLICATION FILED JAN. 23, 1905.
2 SHEETS—SHEET 2.
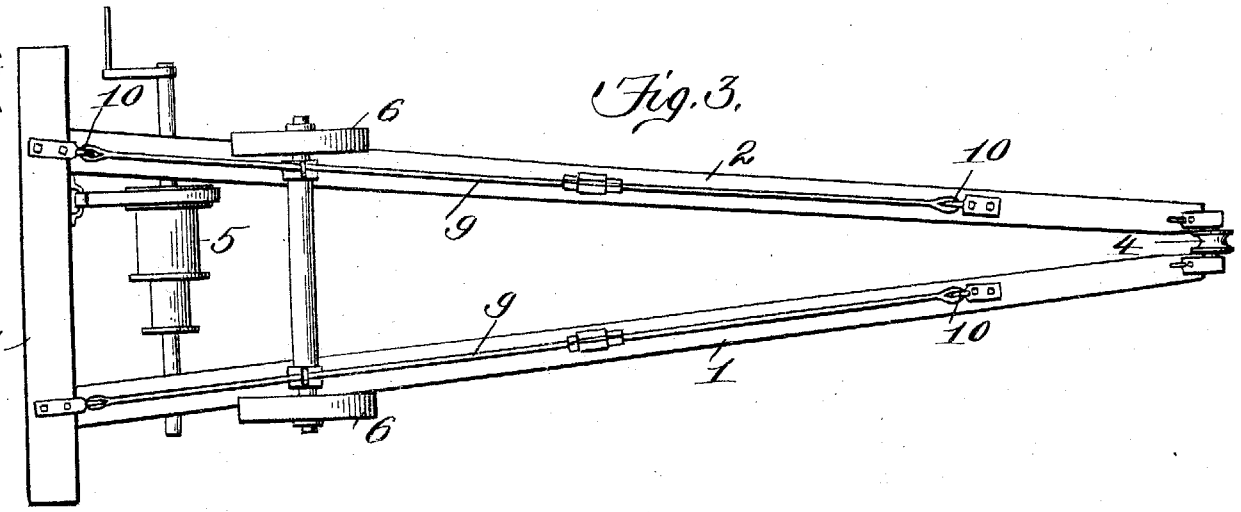
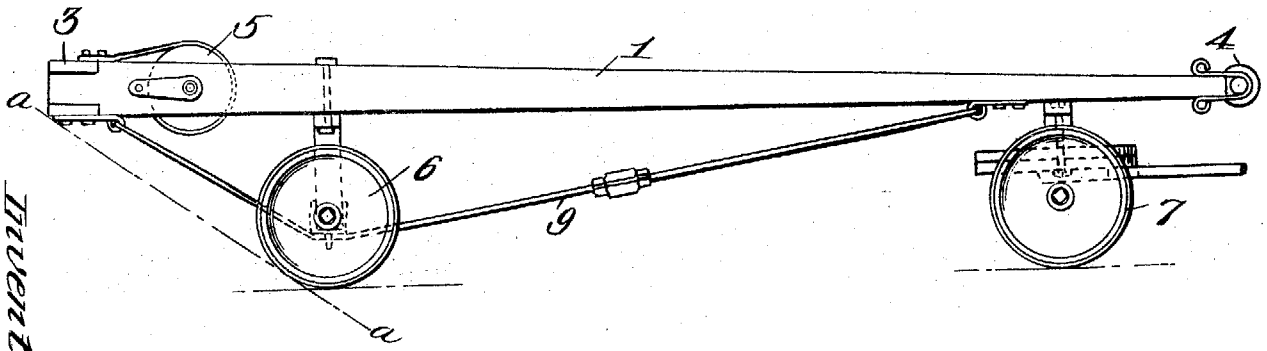
Witnesses:
C. D. Kesler
James L. Morris, Jr.
Inventor
Frank W. Pennell
By James L. Morris
Atty.
ANDREW B. GRAHAM CO., PHOTO-LITHOGRAPHERS, WASHINGTON, D. C.

UNITED STATES PATENT OFFICE.

FRANK W. PENNELL, OF LIMA, OHIO, ASSIGNOR OF TWO-THIRDS TO RODERICK MORRISON, OF GIBSONBURG, OHIO, AND THOMAS C. PENNELL, OF LIMA, OHIO.

PORTABLE RIG FOR PULLING OIL-WELLS.

No. 12,389. Specification of Reissued Letters Patent. Reissued Sept. 12, 1905.

Original No. 738,353, dated September 8, 1903. Application for reissue filed January 23, 1905. Serial No. 242,429.

*To all whom it may concern:*

Be it known that I, FRANK W. PENNELL, of Lima, county of Allen, and State of Ohio, have invented certain new and useful Improvements in Portable Rigs for Pulling Oil-Wells; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention has reference to a portable rig for pulling oil-wells; and it has for its object to provide a rig of simple and inexpensive construction which shall be conveniently portable, being easily set up and taken down and transported from one well to another when it becomes necessary to pull the same.

To this end my invention comprises the novel arrangement of parts hereinafter shown, described, and claimed.

In the drawings, Figure 1 is a perspective view showing the rig supported by guy-wires in position for pulling the well. Fig. 2 is a side elevation of the rig lowered for transportation. Fig. 3 is a bottom plan view of the rig, the forward truck being detached.

The rig proper comprises tapering side sections 1 and 2, respectively, spread apart at their lower ends and connected by transverse pieces 3, adapted to provide a broad support for the rig when elevated. At the top of the rig between the upper ends of the sections 1 and 2 is mounted a pulley 4, over which the lifting-cable of the rig is operated, an ordinary windlass 5 being arranged at the lower ends of the sections 1 and 2 to wind and unwind the cable. Near the lower portions of the sections 1 and 2 are permanently attached rollers or wheels 6, adapted when the rig is lowered to support the weight of the same equally distributed on opposite sides thereof. These wheels are mounted so as to take a position considerably removed from the side sections 1 and 2, so that when the rig is lowered from the raised position (shown in Fig. 1) the wheels 6 will be in contact with the ground (indicated by the line *a a*, Fig. 2) and support the weight of the rig while the latter is still elevated at an angle of approximately thirty degrees. The weight of the rig being now counterbalanced and supported upon the wheels 6, the forward end of the rig may be readily lowered. When lowered for the purpose of transportation, a detachable truck arranged with suitable wheels 7 is provided for the forward end of the rig to rest upon. This truck is secured to the rig proper by suitable means, chains being preferably employed for this purpose. One of the most essential features of the invention is the disposition of the permanently-attached rollers or wheels and the means for supporting the same in such manner as to distribute the weight of the sections 1 and 2 equally on opposite sides thereof to effect a balanced structure when the rig or frame is lowered. The truck is located much nearer the diverged ends of the sections than the opposite converged ends thereof; but the weight of the entire derrick structure, as before noted, is equally distributed on opposite sides of the truck to materially assist in transporting or moving the complete device from one well to another. When the shorter portion of diverged ends of the sections comprising the rig or derrick frame is lowered to the ground or inclined with respect to the wheels 6, the longer portion of the said rig or derrick frame is held elevated, and this is facilitated by the arrangement of the working parts including the drum in the rig or derrick frame between the truck or supports for the wheels 6 and the diverged ends of the sections 1 and 2. When the shorter extremity of the derrick-frame is placed on the ground prior to elevating or erecting the same to upright position, the longer portion of the frame is held at such elevation that draft-animals or any other elevating medium will be relieved of considerable weight resistance in the erection of said frame by reason of the preliminary partial elevation, and, furthermore, the frame can be more expeditiously positioned with respect to a well to be pulled. Moreover, the bolster or means to which the wheels 6 are connected and carry the weight of the derrick-frame equally distributed with respect thereto, as stated, results in the change of the center of gravity above the truck or axle of the wheels by lowering the diverged extremities of the frame, so that the weight under these conditions is thrown to the lower end or wider part of the frame, thus elevating the upper end without the application of initial force to arrive at this result. The longer extremity of the frame with respect to the wheels 6 remains elevated until the wider extremity has been fastened by stakes, so as to prevent slipping of the said wider end from its applied position, and through the medium of the pulling force applied to the longer elevated extremity or portion of the frame by the cables or ropes for this purpose the entire frame may be more readily elevated. For the same reasons the lowering of the derrick or frame is rendered easy and without imposing undue strain on the means or mechanism employed for this purpose or of injuring the derrick-frame by jarring or falling. The frame is controlled in its elevating and lowering movements by a cable 11, attached to the end of the elongated extremity thereof, and after the frame is erected to upright position said cable is used as a guy for assisting in maintaining the frame in steady upright position. Also coöperating with the frame are opposing guys 12, which are attached to stakes or other holding means, as clearly shown by Fig. 1. A tongue or reach attached to the forward truck permits a team of horses to be hitched thereto to draw the rig to the well to be pulled.

9 represents suitable brace-rods directed over the supports carrying the wheels 6, the same being secured at the ends 10 to the sections 1 and 2, by which means the sections are materially supported, since the rig when in use leans forward at an angle to the ground.

From the foregoing it is apparent that I provide a simple, inexpensive, and easily-operated rig for pulling oil-wells which may be readily transported from place to place, thereby overcoming the usual necessity of maintaining a pulling-rig over each well being pumped and resulting in greatly reducing the expense of pumping a plurality of wells.

The novelty, utility, and advantages of my invention will be apparent.

Having described my invention, what I claim, and desire to secure by Letters Patent, is—

1. In a device of the class set forth, the combination of a rig or derrick frame, a drum disposed in one extremity of the frame and having differential winding-surfaces thereon, means for actuating the drum, an elevating and lowering cable movably engaging the differential winding-surfaces of the drum, the said elevating and lowering cable movably passing over the end of the rig or derrick frame opposite that on which the drum is located, means for holding the rig or derrick frame elevated, and a truck supporting the frame at a point between its ends, the truck being located near the end of the rig or frame having the drum therein, the extremity of the frame between the truck and the terminal of the end carrying the drum having a preponderance of weight holding the remaining part of the rig or frame on the other side of the truck elevated when the drum-carrying extremity is lowered.

2. In a portable rig for oil-wells, a frame having an enlarged extremity carrying elevating and lowering devices, and a truck secured intermediately to the frame and nearer the enlarged extremity, the latter being considerably shorter than the opposite extremity and holding, when lowered to the ground-surface, the longer extremity elevated, the frame having a constant or immovable extent on opposite sides of the truck, and the latter clear of the ground-surface when the frame is disposed in upright position.

3. A portable rig for oil-wells of the class set forth, comprising a frame having tapering side members, the truck supporting the frame at a point between its ends and located nearer the terminal of the diverged extremity, the weight of the frame being equally distributed on either side of the point of application of the truck, an elevating and lowering cable carried by the frame, and a drum in the diverged extremity of the frame with which the cable coöperates, the diverged extremity of the frame carrying the drum, when lowered, holding the longer extremity of said frame on the opposite side of the truck in elevated position to facilitate erection of the frame.

4. A portable rig for oil-wells of the class set forth, comprising a frame with converging side members having an immovable relation with respect to each other, and a truck supporting the frame at a point between its ends and arranged nearer the diverged end, the weight of the frame being equally distributed on either side of the truck and the diverged extremity thereof having a preponderance of weight when lowered to hold the longer portion of the frame on the opposite side of the truck elevated for the purpose of erection, the truck being held clear of the ground-surface when the frame is erected, and means attached to the longer extremity of the frame for drawing the same upwardly.

5. In a device of the class set forth, a portable rig for oil-wells having a frame and a truck supporting the frame at a point between its ends, the frame having a positive immovable extent with respect to opposite sides of the truck, the truck being located nearer one end of the frame than the other, and the weight of the frame equally distributed on either side of the point of support by the truck, the extremity of the frame between the truck and the end to which it is nearer having a preponderance of weight to hold the remaining part of the frame on the other side of the truck elevated when the first-mentioned extremity is lowered.

6. In a device of the class set forth, the combination of a rig or derrick frame, having a drum and an elevating and lowering cable operating therewith, a truck supporting the frame at a point between its ends, the truck being located nearer one end of the frame than the other, guy-cables attached to the end of the longer extremity of the frame and arranged to be secured to resisting devices and an elevating-cable immovably attached to the same extremity of the frame from which the guy-cables extend, said lifting-cable being employed as a guy device when the rig or derrick frame is erected.

7. In a portable pulling-rig for oil-wells, the tapering side sections provided with a pulley at their upper ends and joined together at their lower ends to form a broad support for the rig, wheels mounted upon the side sections near the lower ends, adapted to support the side sections when lowered and to be raised from the ground when the sections are elevated, and the brace-rods carried over the supports for the wheels and secured at the ends to the side sections, substantially as described.

In testimony whereof I have hereunto set my hand in presence of two subscribing witnesses.

FRANK W. PENNELL.

Witnesses:
D. J. Cable,
B. Boggs.